United States Patent

Inatani et al.

[11] Patent Number: 5,970,041
[45] Date of Patent: Oct. 19, 1999

[54] DISC CHANGER DEVICE INCREASING THE DISTANCE BETWEEN A GRIPPED DISC AND NEIGHBORING DISCS ON BOTH SIDES OF THE GRIPPED DISC

[75] Inventors: Akihisa Inatani, Kanagawa; Yoshihiro Kajiyama, Chiba; Toshio Tanaka, Kanagawa, all of Japan

[73] Assignee: Sony Corporation, Tokyo, Japan

[21] Appl. No.: 09/169,374

[22] Filed: Oct. 9, 1998

Related U.S. Application Data

[62] Division of application No. 08/891,223, Jul. 10, 1997.

[30] Foreign Application Priority Data

Jul. 15, 1996 [JP] Japan .................................. 8-185218

[51] Int. Cl.⁶ ...................................................... G11B 17/08
[52] U.S. Cl. ............................................................ 369/192
[58] Field of Search ........................... 369/36, 178, 192; 360/92

[56] References Cited

U.S. PATENT DOCUMENTS

2,616,706  11/1952  Maurer ..................................... 369/192
4,151,572  4/1979  Yamamoto et al. ................... 360/98.02
5,138,591  8/1992  Ogawa et al. ............................. 369/36
5,682,364  10/1997  Ogawa ....................................... 369/36

Primary Examiner—George J. Letscher
Attorney, Agent, or Firm—Limbach & Limbach L.L.P.

[57] ABSTRACT

A disc changer device includes a housing section, a transporting unit, a recording and/or reproducing unit and a movement unit. The housing section houses a number of discs, such as compact discs, with a pre-set distance between neighboring discs, in a state in which disc surfaces face one another. The transport unit holds one of the discs in the housing section from the direction of disc thickness for transport between it and the recording and/or reproducing unit. The recording and/or reproducing unit records and/or reproduces the disc transported from the housing section by the transporting unit. The movement unit moves at least one of the discs positioned in the housing section and held by the transporting unit in a direction away from the disc held by the transporting unit when holding the disc from the direction of disc thickness out of the housing section by the transporting unit and/or when returning the disc by the transporting unit into the housing section.

12 Claims, 11 Drawing Sheets

DISC CHANGER DEVICE INCREASING THE DISTANCE BETWEEN A GRIPPED DISC AND NEIGHBORING DISCS ON BOTH SIDES OF THE GRIPPED DISC

This is a divisional of application Ser. No. 08/891,223, filed Jul. 10, 1997, patent pending.

BACKGROUND OF THE INVENTION

1. Field of the Invention

This invention relates to a disc changer device. More particularly, it relates to a disc changer device in which a disc is transported as it is held from the direction of disc thickness.

2. Description of the Related Art

A recording disc as a recording medium for information signals, such as an optical disc or a magneto-optical disc, has so far been proposed. This recording disc has a disc-shaped disc substrate and a signal recording layer deposited thereon.

A disc player apparatus for recording/reproducing information signals for the recording disc has been proposed. This disc player apparatus includes a disc driver having a rotational mechanism for holding and rotating the recording disc and an optical pickup device for writing/reading information signals to the signal recording layer of the recording disc rotationally driven by the rotational mechanism. The optical pickup device includes a semiconductor laser as a light source and an objective lens for condensing the light beam emanated by the semiconductor laser on the signal recording layer of the recording disc.

A disc changer device has so far been proposed, in which plural recording discs are housed in a stacked state, and an optional one of these discs is selected from these discs for loading on the disc driver for recording/reproducing the information signals for the loaded recording disc. Such disc changer device includes a disc stocker for housing therein a number of recording discs in a stacked state and a disc loading mechanism for taking out and transporting the selected recording disc from the disc stocker for loading on the disc driver.

Such a disc loading mechanism has so far been used which has a gripper for gripping one of the recording discs housed and held in the disc stocker. The gripper is designed to be moved from the disc stocker to a position in register with the disc driver.

In such disc changer device, it has been desired to increase the number of recording discs housed therein without increasing the size of the device. To this end, it is necessary to reduce the distance between the recording discs housed and held in a stacked state in the disc stocker.

However, if the distance between the recording discs in the disc stocker is reduced, it becomes difficult to fabricate the gripper inserted into the space between the discs housed within the disc stocker for taking out the recording disc from the stocker. That is, for gripping the desired one of the recording discs housed within the disc stocker, a disc holding portion needs to be inserted into the space between the neighboring discs on both sides of the major surfaces of the desired disc. If the neighboring discs are positioned close to the optional disc for increasing the number of the recording discs that can be housed within the disc stocker, the disc gripping portion of the gripper needs to be reduced in size, such that it becomes impossible to assure a sufficient mechanical strength of the disc gripping portion of the gripper.

Although it may be contemplated to push the recording disc taken out of the disc stocker by a thin member, such as a pin, from the opposite side to the gripper of the disc stocker, the disc loading mechanism tends to be increased in size and complex in structure as compared to the above-mentioned device constructed solely by the gripper.

If the distance between the recording discs held by the disc stocker is reduced, the recording disc taken out from the disc stocker is likely to come into sliding contact with the neighboring recording discs left in the disc stocker to destruct the discs.

SUMMARY OF THE INVENTION

It is therefore an object of the present invention to provide a disc changer device which resolves the above-mentioned problems.

In one aspect, the present invention provides a disc changer device including a housing section in which a plurality of discs are housed with disc surfaces facing one another, a transporting mechanism for holding one of the discs in the housing section from a direction of disc thickness for transporting the disc thus held, and a movement mechanism for moving at least the discs in the housing section lying on both sides of the disc held by the transport mechanism from the direction of disc thickness in a direction away from the disc held by the transporting mechanism when holding the disc from the direction of disc thickness out of the housing section by the transporting mechanism and/or when returning the disc by the transporting mechanism into the housing section.

In another aspect, the present invention provides a disc changer device including a housing section in which a plurality of discs are housed in a state in which the discs are housed with disc surfaces facing one another with a pre-set interval in-between, a transport mechanism for holding one of the discs from the direction of disc thickness for transporting the disc thus held and an actuating mechanism for enlarging the spacing between the one disc in the housing section held by the transport mechanism and at least both discs disposed on both sides of the one disc so as to be larger than the pre-set interval during the time the disc is held by the transport mechanism from the direction of disc thickness and during the time the disc is returned into the housing section.

In yet another aspect, the present invention provides a disc changer device including a housing section in which a plurality of discs are housed in a state in which the discs are housed with disc surfaces facing one another with a pre-set interval in-between, a transport mechanism for holding and transporting one of the discs from the direction of disc thickness for transporting the disc from the housing section, a recording and/or reproducing mechanism for recording and/or reproducing the one disc transported by the transport mechanism and a movement mechanism for moving at least both discs disposed on both sides of the one disc in a direction away from the one disc held by the transport mechanism during the time the disc is held by the transport mechanism from the direction of disc thickness and transported from the housing section and/or during the time the disc is returned into the housing section by the transport mechanism.

DESCRIPTION OF THE PREFERRED EMBODIMENTS

Referring to the drawings, a disc changer device according to the present invention will be explained in detail. In the embodiments, the present invention is applied to a disc changer in which an optical disc, such as a so-called compact disc, is taken out for reproduction from a disc stocker holding a number of such optical discs.

The embodiments of the present invention are explained in the following sequence:
[1] Structure of an Optical Disc
[2] Structure of a Disc Stocker
[3] Structure of a Disc Driver
[4] Structure of a Cam mechanism
[5] Structure of Disc Loading Means
[6] Structure of a Disc guide Member
[7] Operation of Disc Changer Device
[1] Structure of an Optical Disc Referring to FIGS. 1 and 7, an optical disc 201 includes a disc substrate formed of a transparent or light-transmitting material, exemplified by a synthetic resin material, such as polycarbonate or polymethyl methacrylate, or glass, and a signal recording surface formed on the major surface of the disc substrate. The signal recording surface is formed by forming a track including a large number of pits corresponding to recording data on the disc substrate. If the optical disc is a recordable optical disc capable of recording data thereon, a signal recording layer formed of a magnetic material is deposited in place of the track formed by the above-mentioned pits.

At the center of the disc substrate is formed a chuck opening 202 for centering the optical disc 201 on a disc driver as later explained. On the signal recording surface of the optical disc 201, there is formed a track having the above-mentioned pits substantially concentrically or spirally with the center of curvature of the track coinciding with the center of the chuck opening 202. If the optical disc is a recordable optical disc, recording data is recorded on a signal recording layer for forming a substantially concentric or spiral track (s) having the center of curvature coincident with the center of the chuck opening 202.

For reading out recording data recorded on the optical disc 201, a light beam is illuminated in a converged state on the track of the optical disc 201 and changes in light intensity or in the direction of polarization of the reflected light by the optical disc 201 are detected for reading out recording data recorded on the track of the optical disc 201.

[2] Structure of a Disc Stocker

Figure 1:
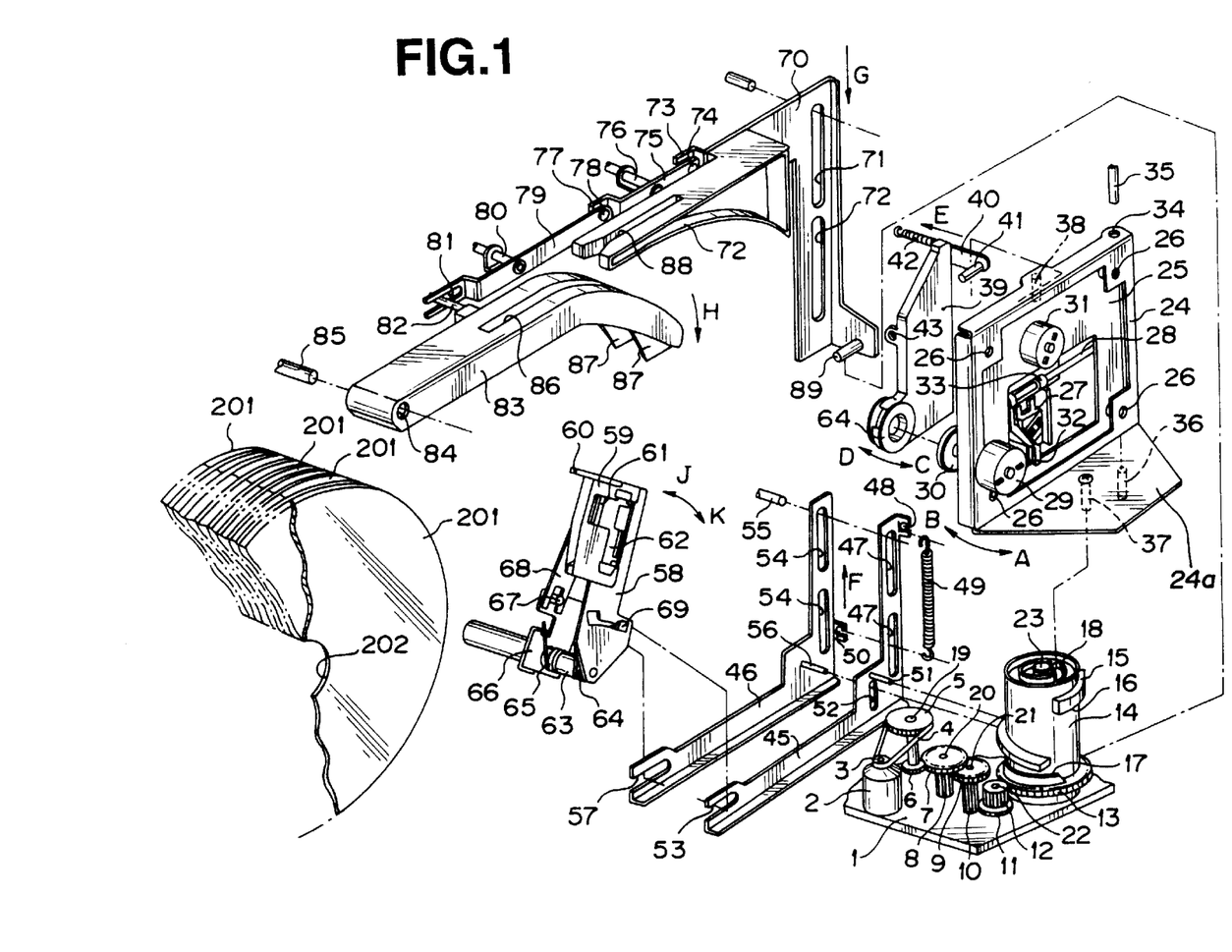
FIG. 1 is an exploded perspective view showing the structure of a disc changer device embodying the present invention.
Figure 7:
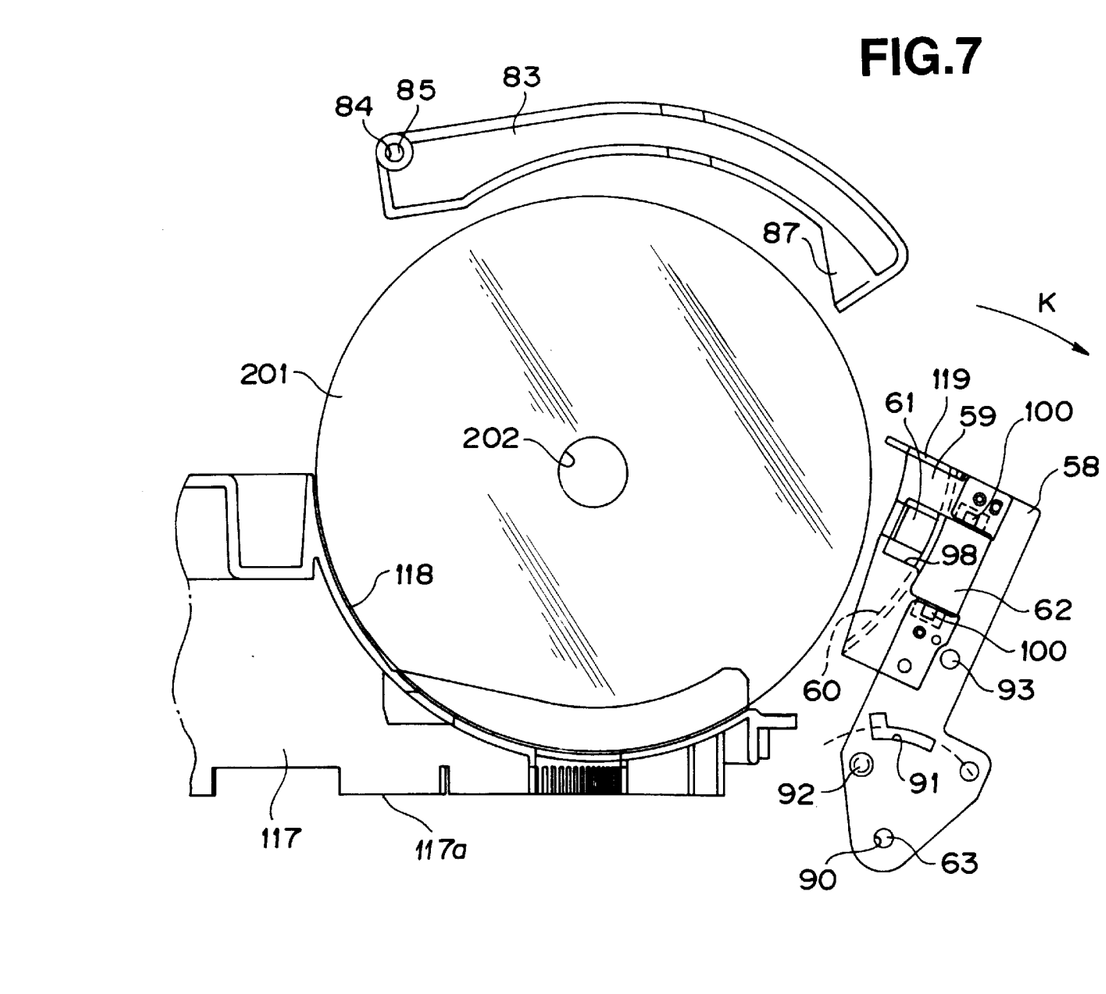
FIG. 7 is a side view showing the state of the disc guide and the disc takeout mechanism in an initial state of the disc changer device.

Referring to FIGS. 1 and 7, the disc changer device includes a disc stocker housing and holding therein plural optical discs in parallel with one another with major surfaces of the discs facing the major surfaces of the neighboring discs. The optical discs 201 are housed within the disc stocker 117 with the major surfaces of the optical discs 201 lying at right angles to a bottom surface 117a of a stocker 117 of FIG. 7 with the distances between neighboring optical discs 201 being of a pre-set pitch. This disc stocker 117 has a substantially semi-cylindrically-shaped recess 118 on which the lower edge of each optical disc 201 is set and which supports the lower edge of each optical disc 201. The recess 118 is opened towards above and has plural partitions extending at right angles to the bottom surface 117a of the stocker 117 for housing the optical discs 201 parallel to one another. The optical discs 201 are maintained at a constant distance from the neighboring optical discs by being set by these partitions.

This disc stocker 117 is arranged at a forward position in an outer casing, not shown, of the disc changer device. The disc stocker 117 and a disc drive as later explained are moved relative to each other, so that a pre-set optical disc 201 accommodated in the disc stocker 117 faces the disc drive by a mechanism, not shown.

In the present embodiment, the disc stocker 117 is constructed so that a line interconnecting the centers of the optical discs 201 represents a straight line parallel to the bottom surface 117a of the disc stocker 117. However, with the disc changer device according to the present invention, the line interconnecting the centers of the optical discs housed and held therein proves to be a horizontal arc or a circle relative to the bottom surface 117a.

[3] Structure of a Disc Driver

This disc changer device includes a disc driver 24 and a chuck arm 39, as shown in FIG. 1. This disc driver 24 has a frame 24a and a chassis 25 supported for movement relative to the frame by four springs 26. The disc driver 24 is disposed at a rear portion of the disc stocker 117 within the outer casing, not shown, of the disc changer device, and is positioned facing the rim of each optical disc 201 housed within the disc stocker 117. This disc driver 24 is arranged so that the major surface of the chassis 25 will be parallel to the major surface of the optical disc 201 facing the disc driver 24 of the disc stocker 117.

The disc driver 24 has an optical pickup device 27 and a spindle motor 29 arranged on the chassis 25. The spindle motor 29 is mounted on the chassis 25 so that its driving shaft is perpendicular to the chassis 25. The driving shaft of the spindle motor 29 carries a substantially disc-shaped disc table 30. The mid portion of the disc table 30 has a substantially conically-shaped protrusion which may be engaged in the chuck opening 202 of the optical disc 201 for positioning and centering the optical disc 201.

The optical pickup device 27 has a guide opening 33 and support pawls 32. The guide opening 33 is passed through by a guide shaft 28 mounted parallel to the major surface of the chassis 25. The support pawls 32 are engaged in a clipping fashion with edges of a through-hole formed in the chassis 25 in register with the range of movement of the optical pickup device 27. The optical pickup device 27 is moved into and out of contact with the spindle motor 29 by the driving power transmitted by a thread motor 31 arranged on the chassis 25 via a driving power transmitting mechanism; not shown.

On the optical pickup device 27 is mounted an objective lens driving mechanism adapted for movably supporting the objective lens. The objective lens is designed for converging a light beam radiated from the semiconductor laser as a light source. The objective lens has its optical axis extending parallel to a driving shaft of the spindle motor 29 and emits a light beam towards the distal end of the driving shaft of the motor 29. The light beam, radiated via the objective lens, scans the entire surface of the signal recording surface of the optical disc by the optical pickup device 27 being moved into and out of contact with the spindle motor 29 under the driving force of the motor 31.

The disc driver 24 has a rear portion of a frame 24a thereof pivotally supported so that a forward position of the frame 24a is movable in the left-and-right direction as indicated by arrows A and B in FIG. 1. The upper and lower surfaces of a rear edge of the frame 24a are formed with upper and lower pairs of support holes 34. In FIG. 1, the lower support holes are not shown. These support holes 34 are engaged by upper and lower pairs of support shafts 35, 36 arranged in an outer casing, not shown. These support shafts 35, 36 are arranged on the same axis so that the frame 24a is rotated about a straight line interconnecting the support shafts 35, 36 as an axis of rotation.

A chuck arm 39 has a support hole 43 partway so that the chuck arm is rotatably supported relative to the frame 24a by having a horizontal support shaft, not shown, passed through the support hole 43. On the lower end of the chuck arm 39 is rotatably mounted a substantially disc-shaped chuck plate 44 for facing the disc table 30. This chuck arm 39 is turned in a direction indicated by arrows C and D in FIG. 1 by a tension coil spring 42 mounted between the upper end of the chuck arm 39 and the outer casing, not shown, of the disc exchanger device, for rotating the chuck plate 44 into pressure contact with the disc table 30.

If, with the optical disc 201 loaded on the disc table 30, the chuck arm 39 is turned in a direction in which the chuck plate 44 approaches the disc table, the chuck plate 44 cooperates with the disc table 30 for clamping the rim portion of the chuck opening 202 of the optical disc 201 for holding the optical disc 201 on the disc table 30. At this time, the optical disc 201 is centered on the disc table 30 by the substantially disc-shaped protrusion of the disc table 30 engaged in the chuck opening 202 of the optical disc 201.

On the upper end of the chuck arm 39 is mounted a mating coordinating arm 40 facing the disc driver 24. On the distal end of the mating coordinating arm 40 is mounted a mating coordinating pin 41 for extending parallel to the major surface of the chassis 25 of the disc driver 24 and for being protruded in the horizontal direction. The mating coordinating pin 41 is engaged by a coordinating pin 38 set on the upper end of the frame of the disc driver 24 for extending downwards.

If the disc driver 24 is rotated in a direction away from the chuck arm 39 as indicated by arrow A in FIG. 1, the chuck arm 39 has its upper end rotated towards the disc driver 24 against the bias of the coil spring 42, so that the chuck arm 39 causes the chuck plate 44 to be rotated in a direction away from the disc table 30. If the disc driver 24 is rotated in a direction indicated by arrow B in FIG. 1, that is in a direction towards the chuck arm 39, the chuck arm 39 is rotated, under the bias of the tension coil spring 42, in a direction in which the upper end of the chuck arm 39 is moved away from the disc driver 24 so that the chuck plate 44 is rotated in a direction indicated by arrow C in FIG. 1, that is in a direction approaching the disc table 30.

On the lower edge of the disc driver 24 is set a first profiling pin 37 for extending towards the lower side of the driver 24. This first profiling pin 37 is engaged with the groove-shaped first cam 18 formed on the upper end face of a cam tube 14 as later explained. The result is that the disc driver 24 is run in rotation with rotation of the cam tube 14.

[4] Structure of a Cam Mechanism

The cam tube 14 is substantially cylindrically-shaped and is rotatably supported for rotation about a support shaft 23 arranged vertically upright on the bottom plate 1 of the outer casing of the disc changer device. On the upper end face of the cam tube 14 is formed a substantially helically-shaped first cam 18. This first cam 18 is engaged by the first profiling pin 37 of the disc driver 24.

Figure 13:
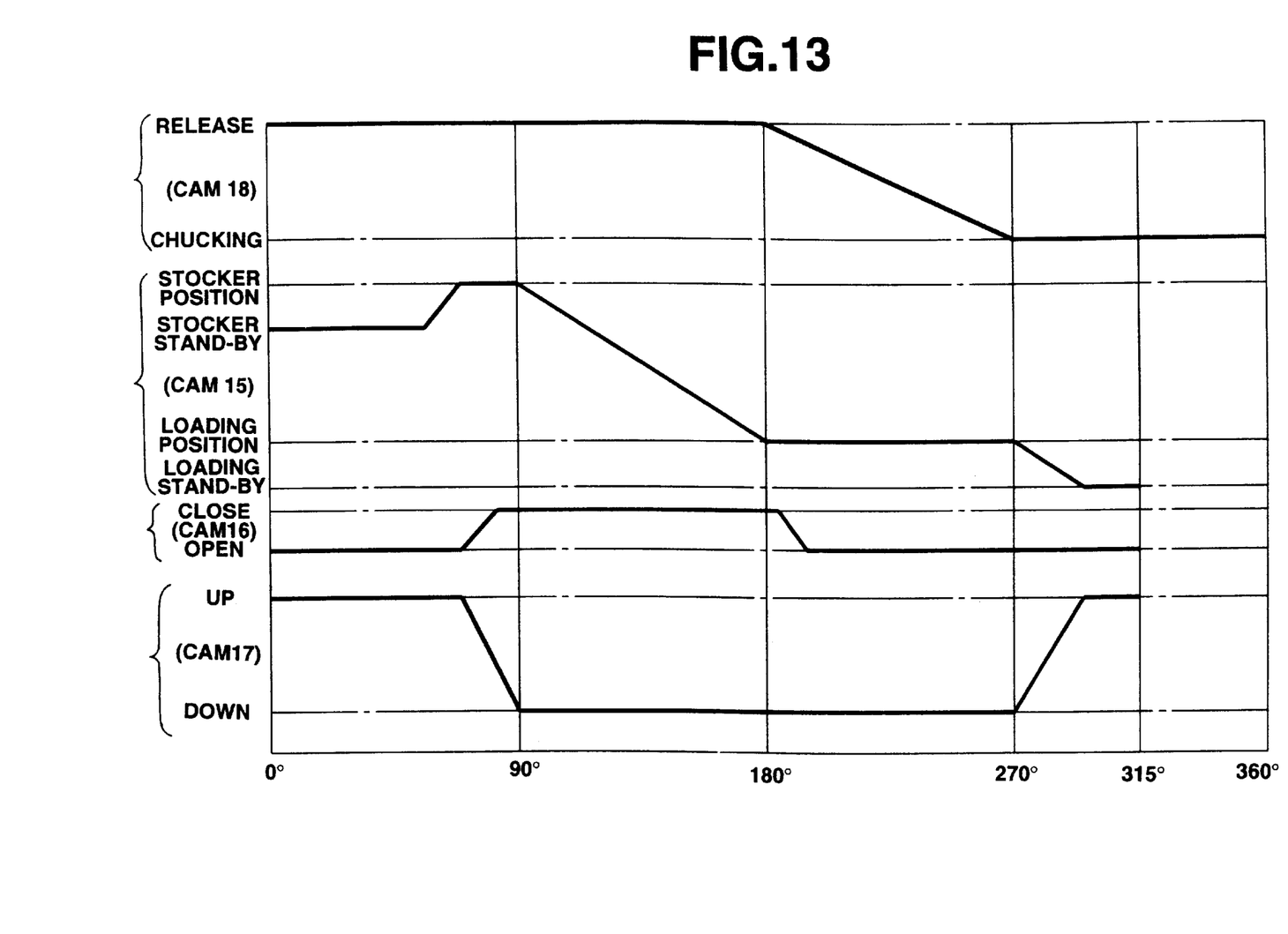
FIG. 13 is a cam diagram illustrating the cam profile of a cam for moving the disc takeout mechanism, disc guide and the disc drive in the disc changer device.

The cam tube 14 is rotatable about 315° as shown in FIG. 13. If the cam tube 14 is at the 0° position (initial position), the disc driver 24 is at the initial position (release position) in which the disc driver is moved away from the chuck arm 39. During rotation of the cam tube 14 for about 90° since the time when the cam tube 14 is rotated to a 180° position in which it is rotated through 180° from its 0° position (initial position) until the time when the cam tube 14 is rotated to a 270° position in which it is rotated through 270° from its 0° position (initial position), the disc driver 24 is rotated from the release position as far as the position approaching the check arm 39 (chuck position).

The cam tube 14 is rotated by a cam motor 2 arranged on the bottom plate 1 of the outer casing. A driving gear 3 is mounted on a driving shaft of the cam motor 2. Between the driving gear 3 and a first transmission gear 5 rotatably supported on the bottom plate 1 via a support shaft 19 is mounted a timing belt 4. A second transmission gear 6 smaller in diameter than the first transmission gear 5 is formed as-one on the first transmission gear 5 coaxially therewith. This second transmission gear 6 is engaged with a third transmission gear 7 rotatably supported on the bottom plate 1 by the support shaft 20. A fourth transmission gear 8 smaller in diameter than the third transmission gear 7 is formed as-one on the third transmission gear 7 coaxially therewith.

The fourth transmission gear 8 meshes with a fifth transmission gear 9 rotatably supported on the bottom plate 1 by a support shaft 21. On the fifth transmission gear 9 is integrally formed a sixth transmission gear 10 smaller in diameter than the fifth transmission gear 9 coaxially therewith. A sixth transmission gear 10 smaller in diameter than the fifth transmission gear 9 is formed as-one on the fifth transmission gear 9 coaxially therewith. This sixth transmission gear 10 is engaged with a seventh transmission gear 11 rotatably supported on the bottom plate 1 by the support shaft 22. On the seventh transmission gear 11 is integrally formed an eighth transmission gear 12 smaller in diameter than the seventh transmission gear 12 coaxially therewith.

The eighth transmission gear 12 meshes with a follower gear 13 formed on the outer rim of the lower end of the cam tube 14. If the cam motor 2 is run in rotation, the cam tube 14 rotated about the support shaft 23.

[5] Structure of Disc Loading Means

The disc changer device has a disc loading mechanism for gripping a selected optical disc 201 from the optical discs 201 held in the disc stocker 117 for taking out the selected optical disc 201 from the disc stocker 117.

Figure 2:
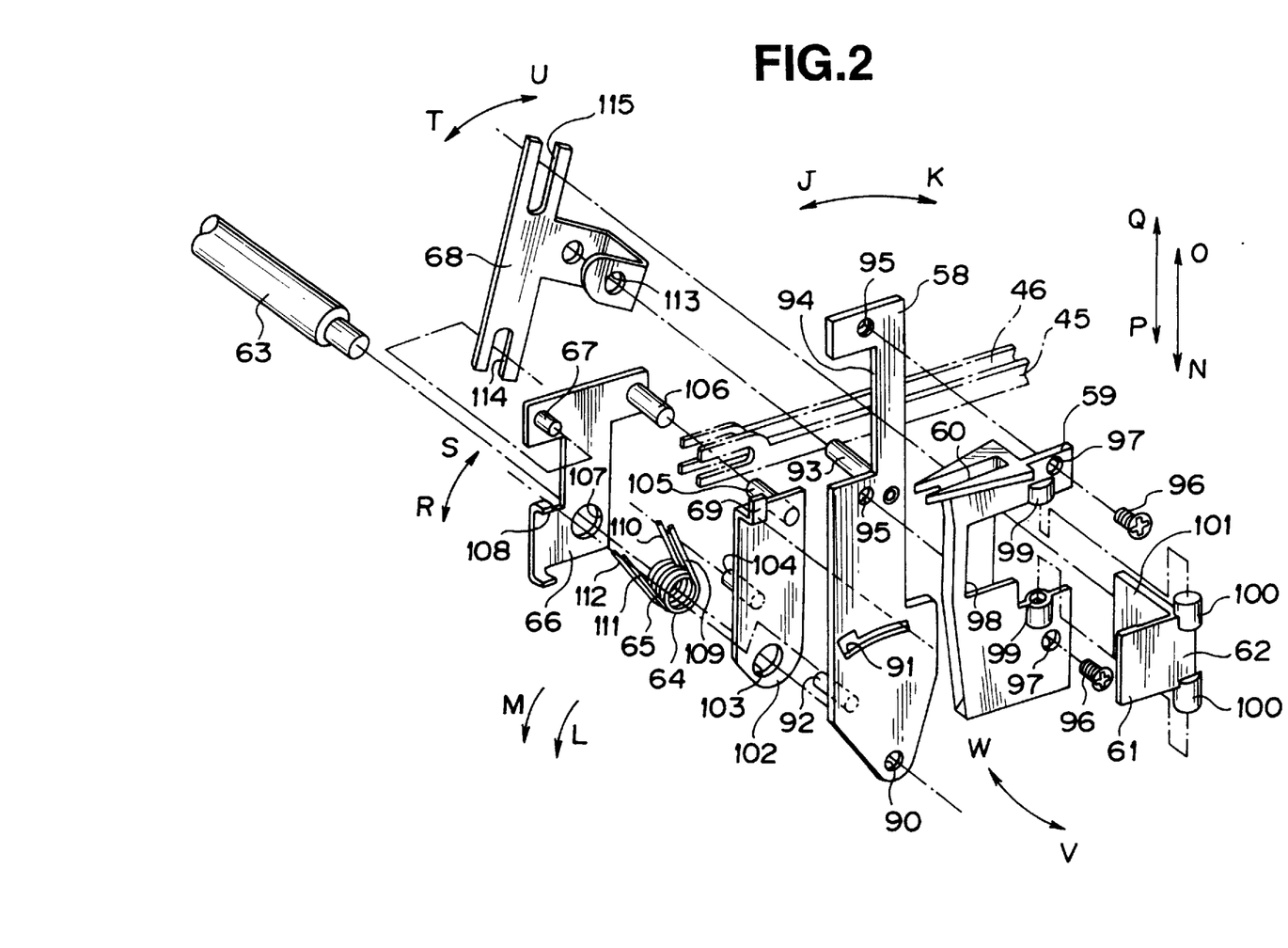
FIG. 2 shows the structure of a disc takeout mechanism as an essential portion of the disc changer device.

Referring to FIGS. 1 and 2, this disc loading mechanism includes a gripper arranged between the disc stocker 117 and the disc driver 24 for gripping the outer rim portion of the optical disc 201.

The gripper has a disc gripper arm 58 having its proximal end rotatably supported by a supporting shaft 63 in a direction indicated by arrows J and K in FIG. 2. The supporting shaft 63 is arranged for extending in a direction substantially parallel to the driving shaft of the spindle motor 29 within the outer casing of the disc changer device. On the distal end of the gripper arm 58 facing the disc stocker 117 is formed an interrupted portion 94. A disc gripper block 59 is mounted on the distal end of the disc gripper arm 58 by a pair of set screws 96, 96. These set screws 96, 96 are introduced into a pair of screw inserting holes 97, 97 formed in the disc gripper block 59 and screwed into a pair of tapped holes 95, 95 formed at the distal end of the disc gripper arm 58 for mounting the disc gripper block 59 on the disc gripper arm 58. The disc gripper block 59 is formed of, for example, a synthetic resin material.

The disc gripper block 59 has, on its side facing the disc stocker 117, a longitudinally extending disc inserting groove 60 extending along the rim of the optical disc 201 held by the disc stocker 117. The disc inserting groove 60 is formed so that the peripheral rim of the optical disc 201 can be inserted therein. The disc gripper block 59 has a cut-out 98 in register with the interrupted portion 94 of the disc gripper arm 58. The upper and lower edges of the cut-out 98 are formed with a pair of shaft supporting holes 99, 99. These shaft supporting holes 99, 99 are coaxial with each other and are arranged for extending in a direction parallel to the direction proceeding from the proximal end towards the distal end of the disc gripper arm 58.

On the disc gripper block 59 is rotatably mounted a gripper member 62 having an upper pair and a lower pair of support shafts 100, 100 rotatably engaged in the shaft supporting holes 99, 99. These support shafts 100, 100 are provided coaxially with one another and are mounted in a direction parallel to the direction parallel to the direction proceeding from the proximal end towards the distal end of the disc gripper arm 58. This gripper member 62 has a gripper piece 61 which is positioned in the cut-out 98 of the disc gripper block 59. If the gripper member 62 is rotated relative to the disc gripper block 59, the gripper piece 61 is intruded into and emerges from the disc inserting groove 60 via the cut-out 98 from the direction shown by arrows V and W in FIG. 2. When intruded into the disc inserting groove 60, the gripper piece 61 holds the optical disc 201 inserted into the groove 60 in cooperation with a lug 116 formed on the inner wall of the groove 60.

Figure 4:
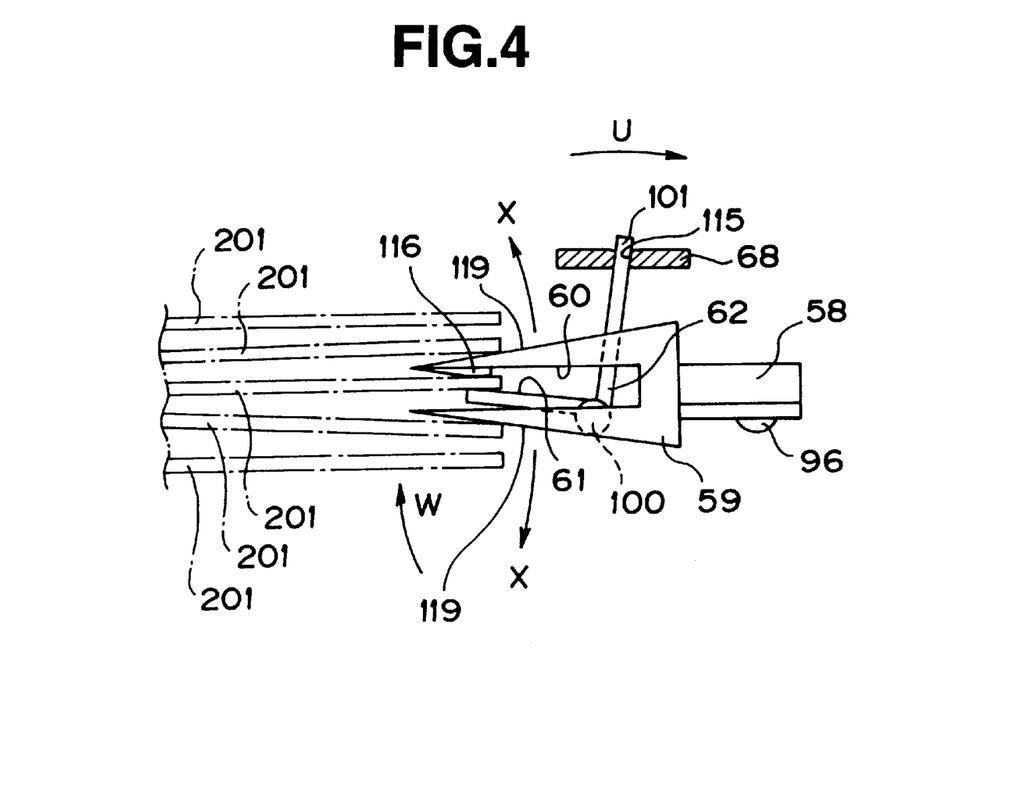
FIG. 4 is a schematic plan view showing the state in which the disc takeout mechanism in the disc changer device facing an optical disc housed within the disc stocker.

With the rim of the optical disc 201 inserted in the disc inserting groove 60, the gripper member 62 is rotated relative to the disc gripper block 59 in a direction indicated by arrow U in FIG. 4 so that the gripper piece 61 is intruded via cutout 98 into the disc inserting groove 60, as a result of which the gripper piece 61 clamps the rim of the optical disc 201 in cooperation with the lug 116 on the inner wall of the disc inserting groove 60.

The gripper member 62 is formed with an operating piece 101 substantially at right angle with the gripper piece 61. A pair of support shafts 100, 100 are formed at an intersecting portion of the gripper piece 61 with the operating piece 101. The operating piece 101 is protruded laterally of the disc gripper arm 58 via interrupted portion 94 of the disc gripper arm 58. The gripper member 62 is moved back and forth relative to the disc gripper arm 58 in a direction interconnecting the disc stocker 117 and the disc driver 24 so as to be rotated relative to the disc gripper arm 58.

Figure 3:
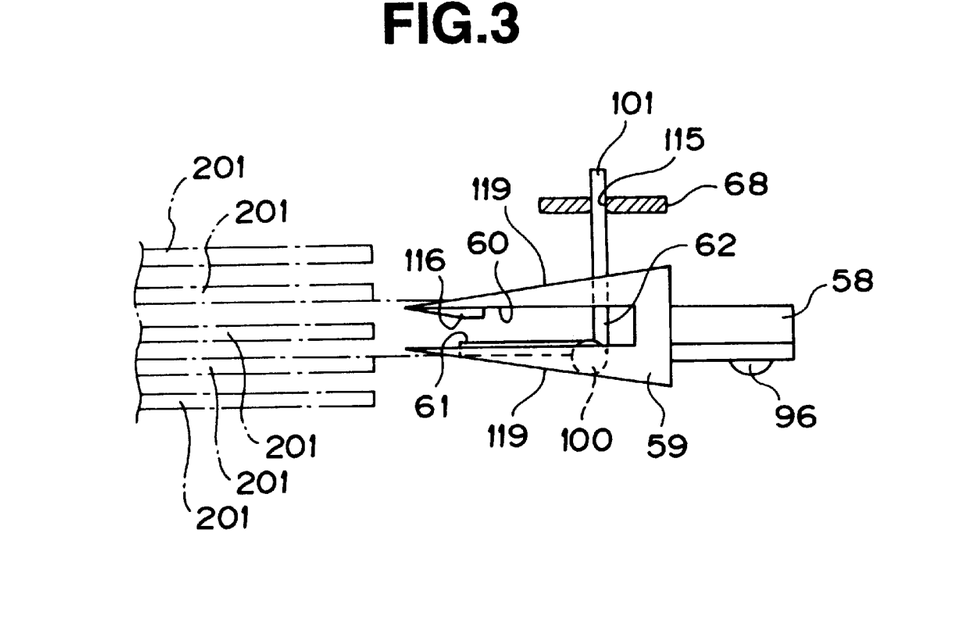
FIG. 3 is a schematic plan view showing the state in which the disc takeout mechanism in the disc changer device facing an optical disc housed within the disc stocker.

In the disc gripper block 59, a pair of projections 119, 119 are formed on the distal end of the disc gripper arm 58, as shown in FIGS. 2 and 3. These projections 119, 119 are positioned on both sides of the disc inserting groove 60 and are each formed to taper or be reduced in width gradually from the proximal end towards the distal end. Stated differently, the projections 119 are formed so as to be triangular in cross-section.

When the disc gripper arm 58 is rotated for moving the disc gripper block 59 towards the disc stocker 117, the projections 119, 119 are introduced into the gap between both major surfaces of one of the plural optical discs held by the disc stocker 117 and both neighboring optical discs, as shown in FIG. 4, for thrusting the rim portions of the neighboring optical discs 201, 201 for moving the neighboring optical discs 201, 201 in a direction indicated by arrow X in FIG. 4, that is in a direction away from the intervening optical disc 201. At this time, the intervening optical disc 201 has its rim portion introduced into the disc inserting groove 60.

The disc stocker 117 is configured so that, when the intervening optical disc 201 has its rim portion thrust by the projections 119, the rim of the optical disc 201 is moved in a direction as indicated by arrow X in FIG. 4 responsive to the thrusting pressure by the projections 119, 119. On the support shaft 63 supporting the disc gripper arm 58 is rotatably mounted a limiter arm 102 adjacent to the disc gripper arm 58. The limiter arm 102 has at its distal end a limiter pawl 69 which is introduced into an arcuate limiter slit 91 formed in the disc gripper arm 58 so that the angle of rotation of the limiter pawl 69 with respect to the disc gripper arm 58 is limited to a pre-set angular range.

Between the disc gripper arm 58 and the limiter arm 102 is arranged a limiter spring 64 comprised of a torsion coil spring having its coiled portion inserted on the support shaft 63. This limiter spring 64 has its arm retained by a spring retainer pin 104 set partway on the limiter arm 102, while having its opposite arm retained by a spring retainer pin 92 set partway on the disc gripper arm 58. This limiter spring 64 elastically biases the disc gripper arm 58 relative to the limiter arm 102 in a direction of being rotated towards the disc stocker 117 as indicated by arrow L in FIG. 2.

The disc gripper arm 58 is positioned relative to the limiter arm 102 at an initial position in which the limiter pawl 69 is abutted against the rear edge of the limiter slit 91. If the disc gripper arm 58 is rotated by an external force relative to the limiter arm 102 in a direction away from the disc stocker 117, the limiter spring 64 is displaced to permit rotation only of the disc retainer arm 58 without permitting rotation of the limiter arm 102.

The disc gripper arm 58 is rotated via limiter arm 102 by a second cam 15 provided on the cam tube 14. The second cam 15 is an end-face cam in which an upper edge of a rib formed on the outer peripheral surface of the cam tube 14 is used as a cam.

That is, the disc changer device includes a rotation transmitting arm 45 moved to follow the profile of the second cam 15. This rotation transmitting arm 45 has a vertically extending portion in which are formed a pair of elongated support slits 47, 47. Into these support slits 47, 47 is inserted a supporting shaft 55 mounted on the outer casing, not shown, for supporting the rotation transmitting arm 45 in an up-and-down direction. A second profiling pin 51 similar in profile to the second cam 15 is provided on a horizontal end (rear end) of the horizontal portion. The opposite forward end of the horizontal portion of the rotation transmitting arm 45 is formed with a slit-shaped engagement portion 53 adapted for engaging with the limiter arm 102. This engagement portion 53 is engaged with an engagement pin 105 provided on the limiter arm 102.

If the cam tube 14 is rotated under the driving power of the motor 2, the rotation transmitting arm 45 is moved in an up-and-down direction as indicated by arrows O and N in FIG. 2. If the rotation transmitting arm 45 is moved in the up-and-down direction, the disc gripper arm 58 is rotated via limiter arm 102 in a direction indicated by arrows J and K in FIGS. 1 and 2. If the load against rotation of the disc gripper arm 58 is not larger than the biasing force of the limiter spring 64, the disc gripper arm 58 is rotated to follow up with rotation of the limiter arm 102 while the disc gripper arm 58 is kept in its initial position with respect to the limiter arm 102.

Figure 8:
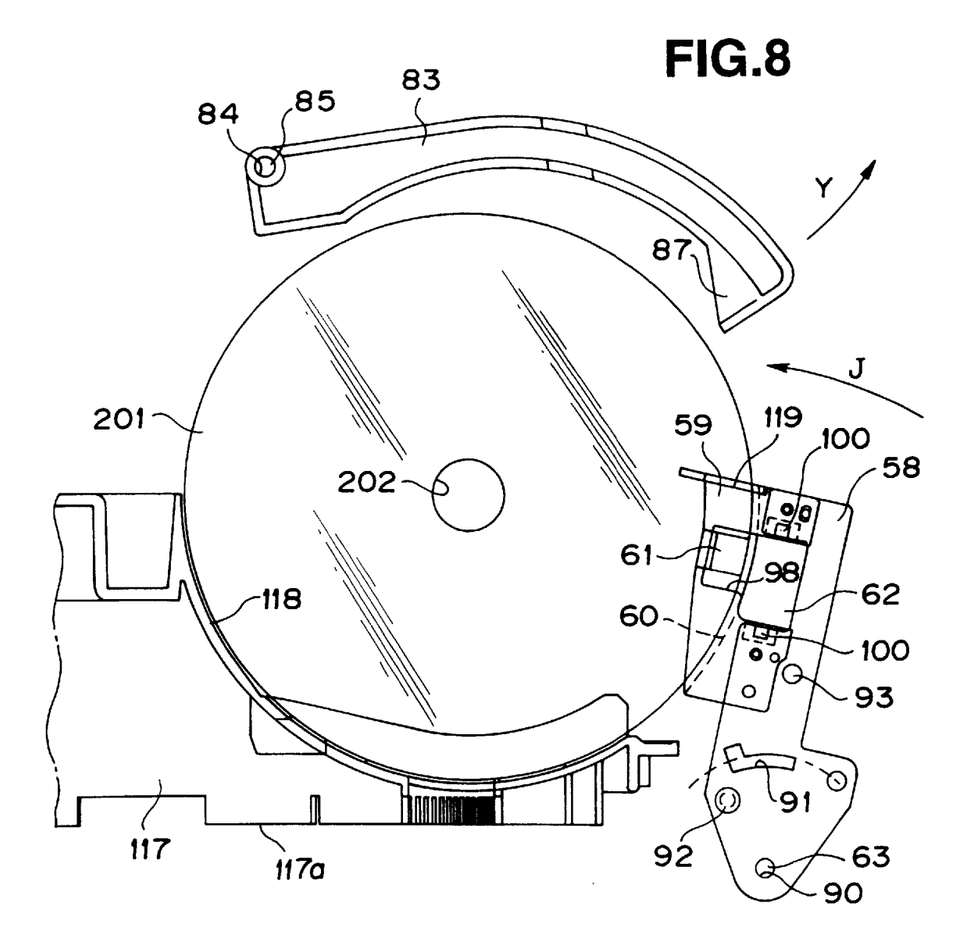
FIG. 8 is a side view showing the state in which the disc takeout mechanism in the disc changer device has been moved towards the disc stocker.

If the cam tube 14 is at the initial position (0° position) in FIG. 13, the disc gripper arm 58 is at a 'stocker position' in which the disc gripper grip 59 approaches the optical disc 201 housed within the disc stocker 117, so that one of the optical discs 201 is inserted into the disc inserting groove 60, as shown in FIG. 8.

If the cam tube 14 has been rotated from a 90° position, in which the cam tube has been rotated 90° from the initial position as far as a 180° position in which the cam tube has been rotated 90° from the initial position shown in FIG. 13 as far as the 180° position, the disc gripper arm 58 pulls out the optical disc 201 inserted into the disc inserting groove 60 whilst it holds the optical disc 201, in order to transport the optical disc 201 thus pulled out to a 'loading position' of transporting the disc to the loading position on the disc driver 24.

During the time the cam tube 14 is rotated further through 90° from the 180° position as shown in FIG. 13 to reach the 270° position, the disc gripper arm is not rotated. The transported optical disc 201 is chucked on the disc driver 24, as described above.

If the cam tube 14 is rotated through about 290° from the initial position to reach the 290° position, as shown in FIG. 13, the disc gripper arm 58 is at a 'loading standby position' of displacing the disc gripper block 59 away from the optical disc 201 loaded on the disc driver 24.

On the disc gripper arm 58 is rotatably mounted an opening/closure arm 68 for rotating the gripper member 62 relative to the disc gripper block 59, as shown in FIG. 2. This opening/closure arm 68 is formed partway with a support hole 113. The opening/closure arm 68 is mounted on the gripper arm 58 for rotation about a support shaft 93 mounted partway on the disc gripper arm 58 as a center of rotation in a direction indicated by arrows U and T in FIG. 2 by passing the support shaft 93 through the support hole 113. If the opening/closure arm 68 is rotated relative to the disc gripper arm 58, the gripper member 62 is rotated relative to the gripper arm 58, as a result of which the gripper piece 61 is protruded via cutout 98 into the inserting groove 60 or receded out of the inserting groove 60.

An engagement portion 114 formed on the opposite side of the opening/closure arm 68 is engaged in a rotation prompting arm 66. A support hole 107 is formed in the proximal end of the rotation prompting arm 66. The rotation prompting arm 66 is rotatably supported by the support shaft 63 inserted into the support hole 107. An engagement pin 67 is provided on the foremost part of the rotation prompting arm 66. The engagement pin 67 is engaged in an engagement portion 114 on the opposite side of the opening/closure arm 68. If the rotation prompting arm 66 is rotated relative to the disc gripper arm 58, the opening/closure arm 68 is rotated relative to the disc gripper arm 58 in a direction indicated by arrows T and U in FIG. 2.

Between the limiter arm 102 and the rotation prompting arm 66 is mounted a torsion coil spring 65 having its coil part placed around the support shaft 63. This torsion coil spring 65 has its arm retained by a spring retainer pin 104 of the limiter arm 1102, while having its opposite arm retained by a spring retainer pawl 108 formed partway on the rotation prompting arm 66. The torsion coil spring 65 resiliently prompts the limiter arm 102 in a direction of rotating the rotation prompting arm 66 towards the disc stocker 117.

The torsion coil spring 65 rotationally prompts the gripper member 62, via rotation prompting arm 66 and opening/closure arm 68, in a direction of clamping the optical disc 201, inserted into the disc inserting groove 60, in cooperation with a lug 116 formed on the inner wall of the groove 61.

The opening/closure arm 68 is rotated via rotation prompting arm 66 by a third cam 16 mounted on the cam tube 14. The third cam 16 is an end-face cam employing, as a cam, a lower edge of a rib which is formed on the outer peripheral surface of the cam tube 14 and an upper edge of which is used as the second cam 15.

The disc changer device includes an opening/closure transmitting arm 46 moved to follow the profile of the third cam 16. This opening/closure transmitting arm 46 is formed in its entirety in a substantially U-shape having a vertically extending portion and a horizontally extending portion. The vertically extending portion of the transmitting, transmitting arm 46 is formed with a pair of elongated support slits 54, 54. The transmitting arm 46 is supported for movement in an up-and-down direction by having a support shaft 55 formed in the outer casing passed through these support slits 54, 54. A third profiling pin 56 adapted to follow the profile of the third cam 16 is provided on an end (rear end) of the horizontally extending portion. This opening/closure transmitting arm 46 has an engagement portion 57 in the form of a cut-out configured for engaging with the rotation prompting arm 66 on the opposite side (forward side) of the horizontally extending portion. This engagement portion 57 is engaged with an engagement pin 106 provided on the rotation prompting arm 66.

This opening/closure transmitting arm 46 is biased for movement towards above, relative to the opening/closure transmitting arm 46, in a direction indicated by arrow F in FIG. 1, by a tension coil spring 49 provided between a spring retainer pawl 50 provided on the transmitting arm 46 and another spring retainer pawl 48 provided on the transmitting arm 45.

If the cam tube 14 is rotated, the opening/closure transmitting arm 46 is moved in the up-and-down direction, indicated by arrows Q and P in FIG. 2. If the opening/closure transmitting arm 46 is moved in the up-and-down direction relative to the rotation transmitting arm 45, the opening/closure arm 68 is rotated relative to the disc gripper arm 58 in a direction indicated by arrows T and U in FIGS. 1 and 2 via rotation prompting arm 66. If the opening/closure transmitting arm 46 is moved in synchronism with the rotation transmitting arm 45, the opening/closure arm 68 is not rotated relative to the disc gripper arm 58, but is rotated along with the disc gripper arm 58 about the support shaft 63 as the center of rotation.

If the cam tube 14 is at the initial position (0° position) as shown in FIG. 13, and the disc gripper arm 58 is at the 'stocker standby position', the opening/closure arm 68 is at the initial position relative to the disc gripper block 59, as shown in FIG. 3, with the gripper piece 61 being then spaced apart from the lug 116 on the inner wall of the disc inserting groove 60.

Figure 9:
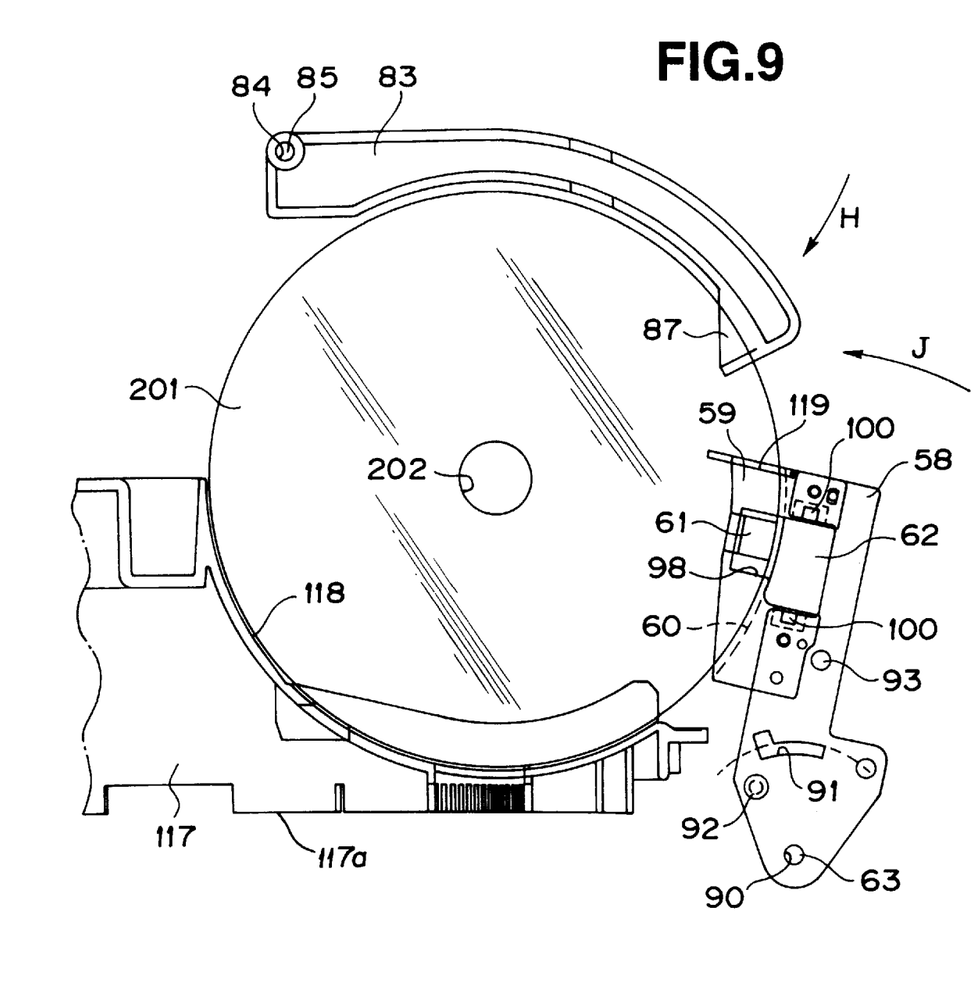
FIG. 9 is a side view showing the state in which the disc guide in the disc changer device has been moved towards the disc stocker and the disc takeout mechanism is holding a disc in the disc stocker.

If the cam tube 14 is rotated to reach the 70° position shown in FIG. 13, with the disc gripper arm 58 being then at the 'stocker position', with the cam tube 14 being subsequently rotated further to reach a 85° position in which the cam tube 14 has been rotated through about 85° from the initial position, the opening/closure arm 68 is rotated relative to the disc gripper block 59 as shown in FIGS. 4 and 9, so that the gripper piece 61 clamps the outer rim of the optical disc 201 in the disc inserting groove 60 in cooperation with the lug 116.

If the cam tube 14 is rotated further to reach the 180° position shown in FIG. 13, the disc gripper arm 58 has been moved to the 'loading position' whilst the optical disc 201 keeps on to be clamped by the gripper piece 61 and the lug 116, and subsequently the cam tube 14 is rotated further through about 200° from the initial position as shown in FIG. 13 to reach the 200° position, the opening/closure arm 68 is reverted to the initial position relative to the disc gripper block 59 to cancel the clamping of the rim of the optical disc 201 by cooperation between the gripper piece 61 and the lug 116.

The clamping by the gripper piece 61 and the lug 116 is then canceled by the disc driver 24 such that the optical disc 201 is chucked and the disc gripper arm 58 is moved to the 'loading standby position'.

[6] Structure of Disc Guide Member

The disc changer device is provided with a first disc guide member 83 having its proximal end formed with a support hole 84. The first disc guide member 83 is rotated about a support shaft 85 mounted within the outer casing by having the support shaft 85 inserted through the support hole 84. This first disc guide member 83 is rotated about the support shaft 85, as shown in FIGS. 8 and 9, for moving the distal end of the first disc guide member 83 into and out of contact with the outer rim of the optical disc 201 held within the disc stocker 117. A slit-shaped cutout 86 passed through by the optical disc 201 having its rim clamped by the disc gripper block 59 and adapted to be taken out from the disc stocker 117 by rotation of the disc gripper arm 58 is formed for extending from partway of the first disc guide member 83 to its distal end portion.

This first disc guide member 83 is rotated via slider 70 and first and second sliding transmitting members 75, 79 by a fourth cam 17 provided on the cam tube 14. The third cam 16 is an end-face cam employing, as a cam, an upper end of a rib formed upright on the upper surface of a flange provided on the cam tube 14 the outer rim of which operates as a follower gear 13. The slider 70 is formed with a pair of longitudinally elongated support slits 71, 71. These support slits 71, 71 are passed through by a support shaft, not shown, provided in the outer casing, for thereby supporting the slider 70 for movement in the up-and-down direction. On the lower end side of the slider 70, there is mounted a fourth profiling pin 89 adapted to follow the profile of the fourth cam 17. The fourth profiling pin 89 is mounted so as to be protruded from the plate surface. This slider 70 is biased by gravity in a downward direction as indicated by arrow G in FIG. 1.

On the upper end of the slider 70 is mounted a second disc guide member 72. This second disc guide member 72 includes an arcuately-shaped lower surface for guiding the upper end of the optical disc 201 taken out from the disc stocker 117 so as to be transported to the disc driver 24, and a slit-shaped cutout 88 through which is passed the optical disc 201.

The upper end of the slider 70 has an engagement portion 73 engaged by a support shaft 74 provided towards the rear side of the first sliding transmitting member 75. This first sliding transmitting member 75 has its mid portion rotatably supported by a support shaft 76 and has an engagement portion 77 towards its forward side. The engagement portion 77 of the first sliding transmitting member 75 is engaged by a support shaft 78 provided on the rear side of a second sliding transmitting member 79, which has its mid portion rotatably supported by a support shaft 80 and carries an engagement portion 81 on its forward side. This engagement portion 81 of the second sliding transmitting member 79 is engaged by an engagement rod 82 protuberantly formed on the lateral surface of a first disc guide member 83.

When the slider 70 is moved by the fourth cam 17 from the upper side as the initial position towards the lower side, as indicated by arrow G in FIG. 1, the first disc guide member 83 is rotated in a direction in which its distal end is directed downwards, as indicated by arrow H in FIG. 1.

Figure 5:
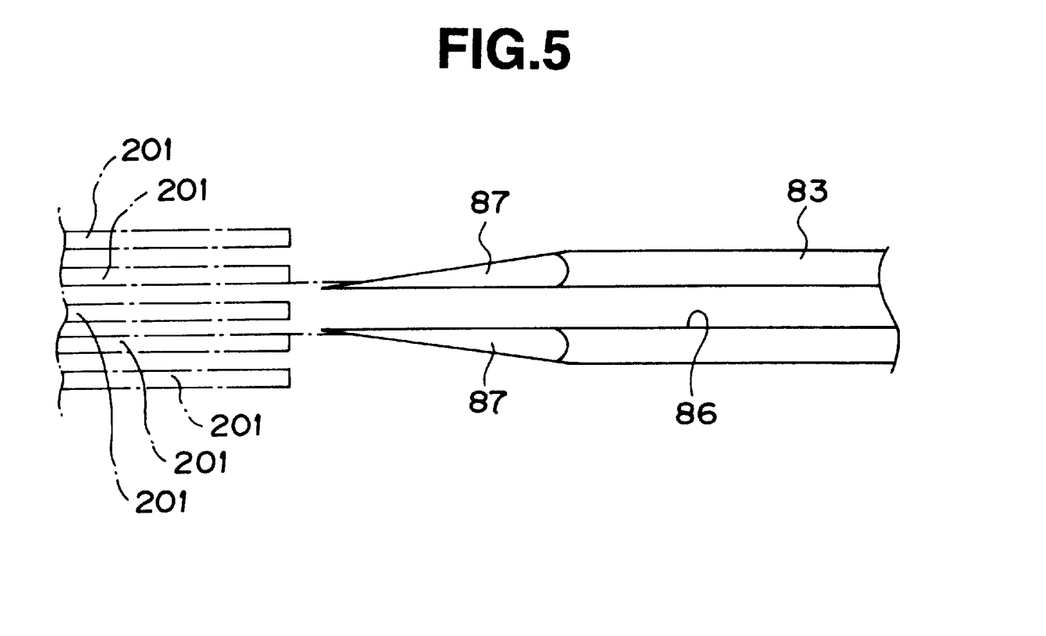
FIG. 5 is a schematic plan view showing the state in which a disc guide in the disc changer device faces an optical disc housed within the disc stocker.
Figure 6:
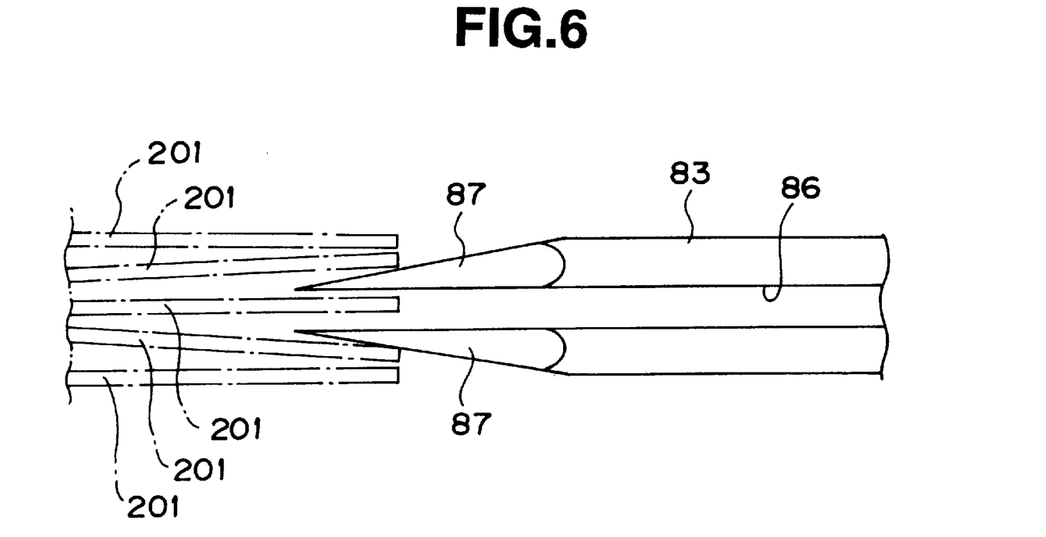
FIG. 6 is a schematic plan view showing the state in which the disc guide in the disc changer device has intruded a pair of pawls into a space between optical discs housed within the disc stocker.

On the lower surface on the distal end of the first disc guide member 83 are formed a pair of lugs 87, 87, as shown in FIGS. 1 and 5. These lugs 87, 87 are formed as pawl-shaped projections having pointed lower ends. When the distal end of the first disc guide member 83 is intruded towards below, the lugs 87, 87 are intruded into gaps on both sides of the optical disc 201 of the optical discs 201 held within the disc stocker 117 as shown in FIG. 6 which is disposed facing the slit-shaped cutout 86 for moving the optical discs 201, 201 on both sides of the optical disc 201 disposed facing the cutout 86 in a direction away from the optical disc 201 facing the cutout 86. The optical disc 201 facing the cutout 86 is clamped by the above-mentioned disc gripper block 59 so as to be transported to the disc drive 24. The detailed operation will be explained subsequently.

If the cam tube 14 is at the initial position (0° position) as shown in FIG. 13, and the disc gripper arm 58 is at the 'stocker standby position', the first disc guide member 83 has its distal end disposed at the initial position (upward position) as shown in FIGS. 5 and 7. At this time, the distal end of the disc guide member 83 is spaced apart from the optical disc 201 in the disc stocker 117.

If the cam tube 14 is rotated to reach the 70° position shown in FIG. 13, with the disc gripper arm 58 being moved to the 'stocker position', and subsequently the cam tube 14 is further moved and rotated through 90° from the initial position to reach the 90° position, the first disc guide member 83 is rotated in a direction of having its distal end moved downwards (downward position) as shown in FIGS. 6 and 9, with the lugs 87, 87 being then intruded into the gap on both sides of the optical disc 201 facing the slit-shaped cutout 86. At this time, the gripper member 62 cooperates with the lug 116 by the gripper piece 61, as shown in FIG. 9, for clamping the rim of the optical disc 201 disposed within the disc inserting groove 60, that is the optical disc 201 facing the cutout 86.

If the cam to be 14 is rotated further to reach the 180° position, the disc gripper arm 58 being then moved to the 'loading position', and subsequently the cam tube 14 is further rotated through about 200° from the initial position to reach the 200° position, the opening/closure arm 68 is reverted to the initial position relative to the disc gripper block 59 to cancel the clamping of the rim of the optical disc 201 by cooperation between the gripper piece 61 and the lug 116. At this time, the first disc guide member 83 remains at the rotated position of moving the distal end of the guide member 83 towards below. Stated differently, the first disc guide member 83 remains at the position in which the lugs 87, 87 have been intruded into the gaps on both sides of the position of holding the optical disc 201 facing the cutout 86.

The optical disc 201 taken out from the stocker 117 by the disc drive 24 is then chucked. When the cam tube 14 then reaches the 290° position shown in FIG. 13, with the cam tube 14 then reaching the 290° position shown in FIG. 13 and with the disc gripper arm 58 being then moved to the 'loading standby position', the first disc guide member 83 is rotated in a direction in which the distal end, that is the lugs 87, 87, are moved upwards to the initial position to recede the lugs 87, 87 from the position in which the optical disc 201 transported by the disc drive 24 has been housed within the stocker 117.

[7] Operation of the Disc Changer Device

In the above-described disc changer device, a desired one of the optical discs 201 can be selected by relative movement between the disc stocker 117 and the disc drive 24 in an arraying direction of the optical discs 201 held by the disc stocker 117, that is a direction interconnecting the optical discs 201. The desired optical disc 201 in the disc stocker 117 is selected by the user entering the number of the desired optical disc, using a remote controller or an operating part in the changer device, not shown, and by the stocker 117 being moved relative to the disc drive 24 under control by a controller, not shown, based on the input data. The selected optical disc 201 faces the disc inserting groove 60 in the disc gripper block 59 and in the slit-shaped cut-out 86 of the first disc guide member 83. When a position detection mechanism of the stocker 117, not shown, arranged on the lower side of the stocker 117, has detected that the selected optical disc 201 faces the disc driver 24, the cam tube 14 is driven by the cam motor 2 based on a control signal from the controller, not shown, so that the cam tube 14 is rotated from the 0° position shown in FIG. 13 through to the 315° position, as a result of which the optical disc 201 is taken out from the disc stocker 117 so as to be loaded on the disc driver 24.

Figure 10:
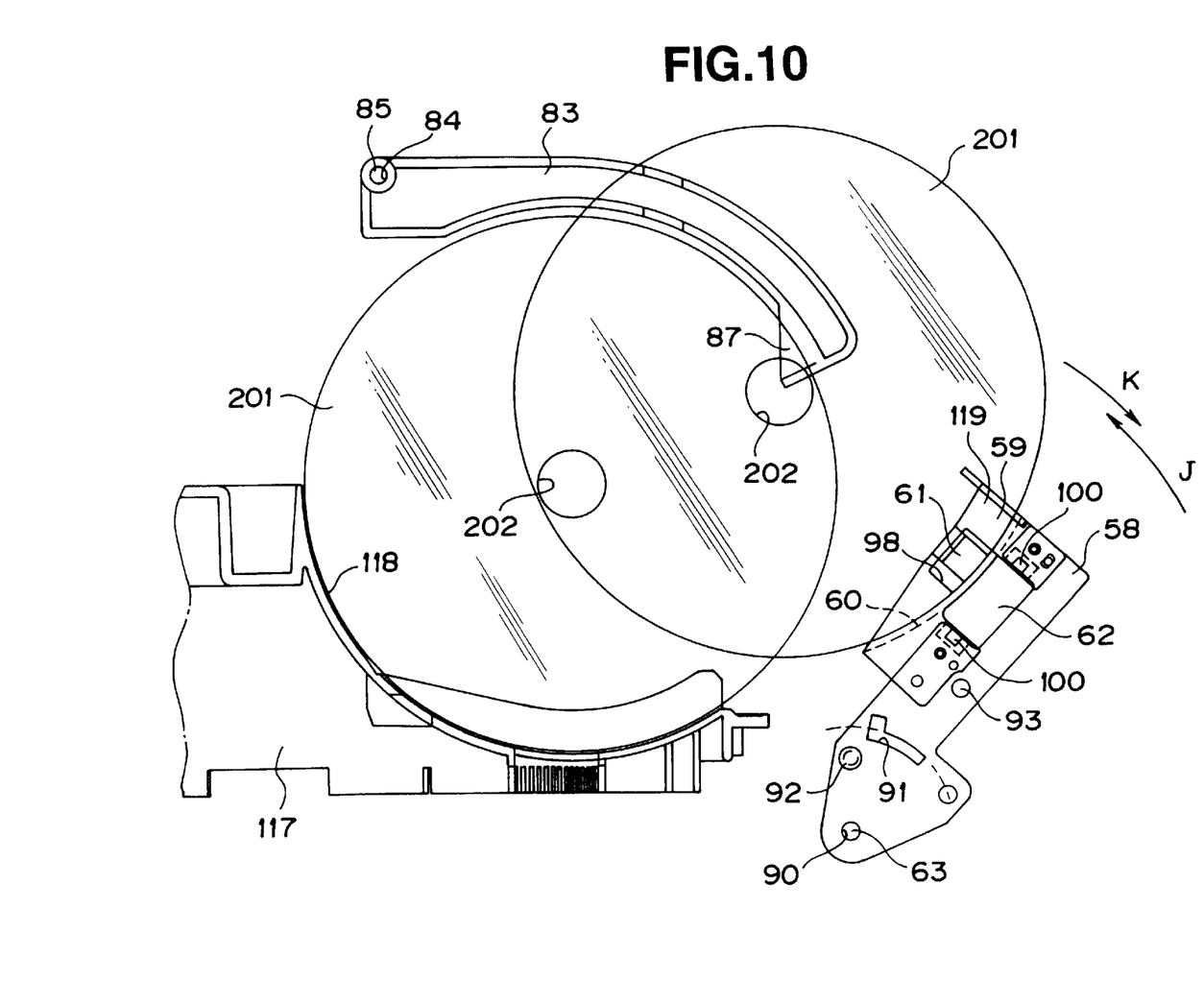
FIG. 10 is a side view showing the state in which the disc takeout mechanism in the disc changer device is taking out a disc in the disc stocker.

The disc gripper arm 58 in the stocker standby position is rotated to the above-mentioned stocker position, as indicated by arrow J in FIG. 8. At this time, the first disc guide member 83 is also rotated in a direction indicated by arrow H as shown in FIG. 9 so that the optical disc 201 is clamped by the disc gripper arm 58. The disc gripper arm 58 is then rotated to the loading position, as indicated by arrow K in FIG. 10, at the same time as the optical disc 201 is transported to a position shown in FIG. 11 so that the optical disc 201 is chucked on the disc driver 24. At this time, the optical disc 201 ceases to be gripped by the disc gripper arm 58 so that the disc gripper arm 58 is rotated further to the loading standby position in a direction indicated by arrow K in FIG. 12. The cam motor 2 then ceases its rotation.

At this time, the lugs 87, 87 of the first disc guide member 83 continue to move the optical discs 201 housed within the disc stocker 117 and positioned on both sides of the optical disc 201 transported by the disc drive 24 in a direction away from the transported optical disc, that is in a direction indicated by arrow X in FIG. 4, since the time the disc gripper block 59 and the gripper member 62 grip the transported disc 201 until the time the optical disc 201 gripped by the disc gripper block 59 and the gripper member 62 is loaded on the disc drive 24, that is until the cam tube 14 reaches the 270° position from the 90° position in FIG. 13.

The optical disc 201, loaded on the disc driver 24, is run in rotation at, for example, a constant linear velocity, for allowing the information signals to be read out from the optical disc 201 by the optical pickup device 27.

For restoring the optical disc 201 loaded on the disc drive 24 to the disc stocker 117, a disc return command or a disc exchange command is entered on the operating unit of the changer device or a remote controller. The controller then causes the cam motor 2 to be rotated in a reverse direction from that for the above-mentioned loading process for reverting the cam tube 14 from the 315° position to the 0° position in FIG. 13.

Figure 11:
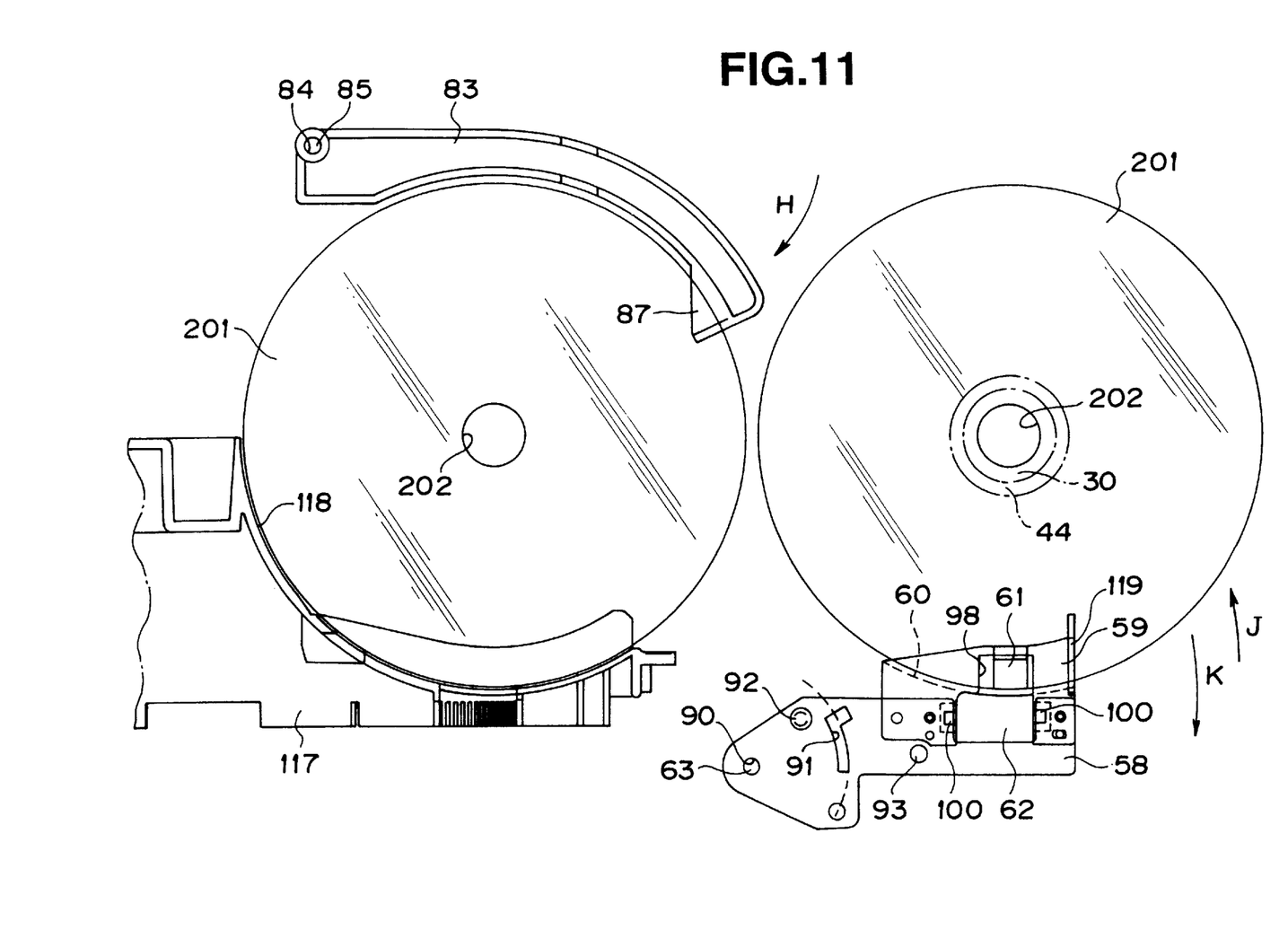
FIG. 11 is a side view showing the state in which the disc takeout mechanism in the disc changer device has transported an optical disc as far as a loading position on a disc drive.
Figure 12:
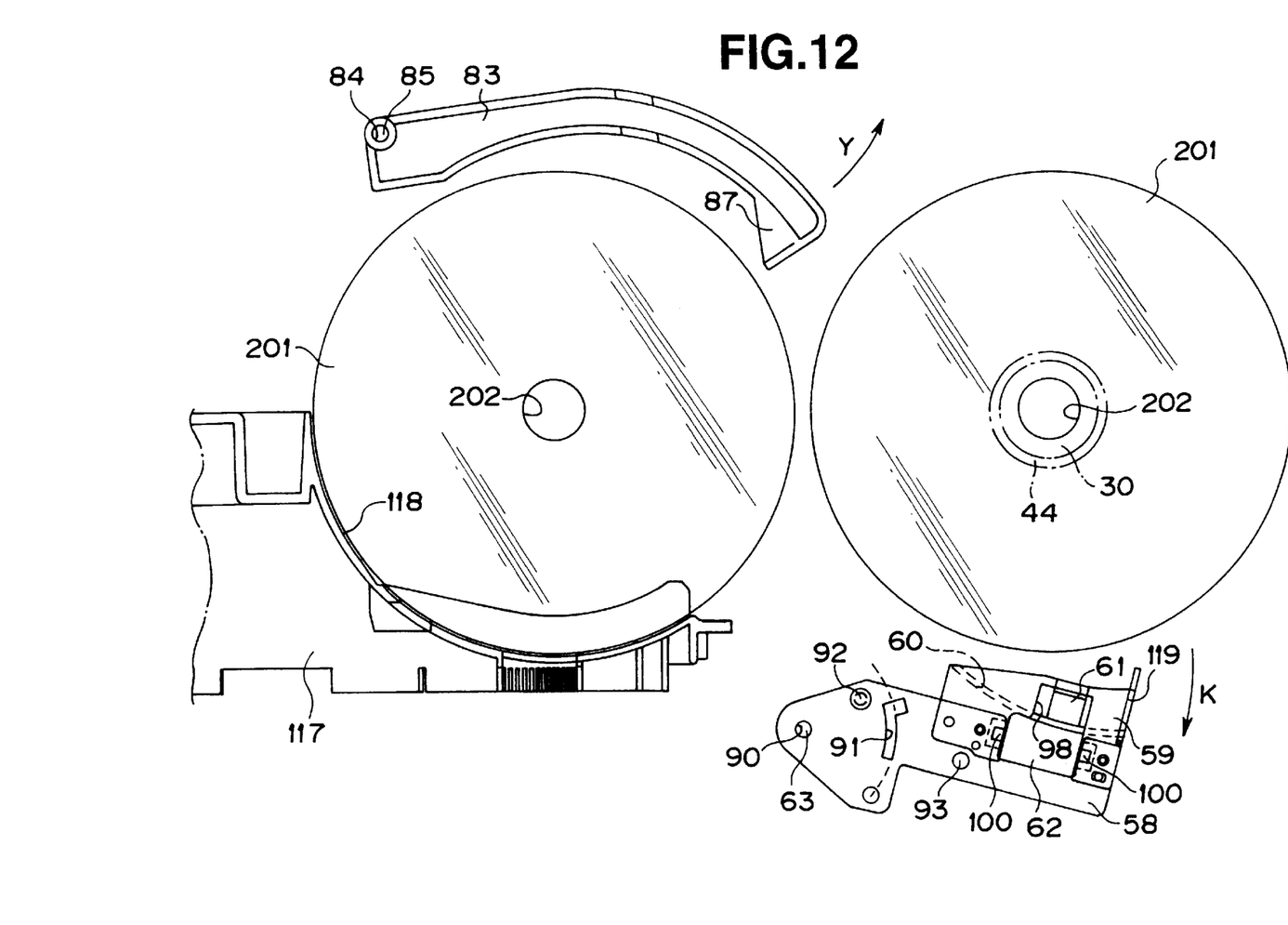
FIG. 12 is a side view showing the state in which the optical disc has been loaded on the disc drive and the disc takeout mechanism has been moved away-from the optical disc.

Specifically, the disc gripper arm 58 is rotated from the loading standby position towards the loading position as indicated by arrow J in FIG. 111. At this time, the optical disc 201 in the disc drive 24 ceases to be chucked. The optical disc 201, which has thus ceased to be chucked, is again clamped by the disc gripper arm 58, which is then rotated in a direction indicated by arrow J in FIG. 9 so as to be moved to the stocker position. The optical disc 201 ceases to be clamped by the disc gripper arm 58 which again is rotated in a direction indicated by arrow H in FIG. 9 so as to be reverted to the stocker standby position.

Before the gripper arm 58 is rotated to the stocker position shown in FIG. 9, the first disc guide member 83 has already been moved in a direction indicated by arrow H in FIG. 9. The lugs 87, 87 of the first disc guide member 83 shift the optical discs 201 on both sides of the disc returned to the disc stocker 117 in a direction indicated by arrow X in FIG. 4 since the time the optical disc 201 loaded on the disc drive 24 ceases to be chucked by the disc drive 24 until the optical disc 201 is returned into the disc stocker 117, that is until the cam tube 14 is restored from the 270° position to the 90° position in FIG. 13, as a result of which the optical disc 201 returned from the disc drive 24 can be prevented from being abutted against or having a disc surface contact with the optical discs disposed on both sides of the disc return position in the stocker 117. In the above-described embodiments, the disc changer device is configured so that an optical disc housed within the disc stocker is taken out for reading out the information recorded thereon. The present invention, however, is not limited to these embodiments and may be applied to a disc changer device in which the information signals can be recorded on the optical disc taken out of the stocker. The present invention may also be modified in many ways without departing from the scope of the invention. For example, for taking out an optical disc from the disc stocker or returning the optical disc into the disc stocker in the above-described embodiments, the discs disposed on both sides of the disc to be taken out from or returned to the disc stocker are moved in a direction away from the disc taken out by a pair of lugs on the distal end of a first optical guide member or returned into the disc stocker. However, any structure deviating from the above-described structure of the preferred embodiments may be used if the interval between the optical discs housed in the disc stocker is enlarged to facilitate takeout or returning operations of the optical disc.

What is claimed is:

1. A disc changer device comprising:

a housing section in which a plurality of discs are housed in a state in which the discs are housed with disc surfaces facing one another with a pre-set interval in-between;

a transport mechanism for gripping one of the discs from the direction of disc thickness for transporting the disc thus held; and an actuating mechanism for enlarging the spacing between the one disc in the housing section gripped by said transport mechanism and at least both discs disposed on both sides of the one disc so as to be larger than said pre-set interval during the time the disc is gripped by said transport mechanism from the direction of disc thickness and during the time the disc is returned into said housing section.

2. The disc changer as claimed in claim 1 wherein said actuating mechanism widens the distance between the disc gripped by said transport mechanism and at least both discs disposed on both sides of the one disc so as to be larger than said pre-set interval during the time until the disc transporting operation by said transport mechanism is terminated.

3. The disc changer as claimed in claim 2 wherein said actuating mechanism enlarges the spacing between the one disc in the housing section gripped by said transport mechanism and at least both discs disposed on both sides of the returning position of the one disc gripped by said transport mechanism so that said spacing will be larger than said pre-set interval before starting the returning of the disc into said housing section by said transporting mechanism.

4. The disc changer as claimed in claim 2 wherein said actuating mechanism includes a pair of actuating portions inserted into a space between neighboring ones of the discs housed in the housing section, said actuating portions being moved between an upper position above the housing section spaced apart from the disc housed in said housing section and a lower position in which the actuating portions are inserted into the space between neighboring discs.

5. The disc changer device as claimed in claim 4 wherein said paired actuating portions are each tapered in cross-section from the proximal end towards the distal end thereof.

6. The disc changer as claimed in claim 1 wherein said actuating mechanism enlarges the spacing between the one disc in the housing section gripped by said transport mechanism and at least both discs disposed on both sides of the one disc so that said spacing will be larger than said pre-set interval after the disc housed within said housing section is gripped by said transport mechanism from the direction of disc thickness.

7. A disc changer device comprising:

a housing section in which a plurality of discs are housed in a state in which the discs are housed with disc surfaces facing one another with a pre-set interval in-between;

a transport mechanism for holding one of the discs from the direction of disc thickness for transporting the disc thus held;

an actuating mechanism for enlarging the spacing between the one disc in the housing section held by said transport mechanism and at least both discs disposed on both sides of the one disc so as to be larger than said pre-set interval during the time the disc is held by said transport mechanism from the direction of disc thickness and during the time the disc is returned into said housing section, wherein said actuating mechanism widens the distance between the disc held by said transport mechanism and at least both discs disposed on both sides of the one disc so as to be larger than said pre-set interval during the time until the disc transporting operation by said transport mechanism is terminated, said actuating mechanism includes a pair of actuating portions inserted into a space between neighboring ones of the discs housed in the housing section, said actuating portions being moved between an upper position above the housing section spaced apart from the disc housed in said housing section and a lower position in which the actuating portions are inserted into the space between neighboring discs, and said actuating mechanism includes a guide member having a guide portion for guiding a disc transported by said transporting mechanism from the housing section, said paired actuating portions being provided on said guide member.

8. A disc changer device comprising:

a housing section in which a plurality of discs are housed in a state in which the discs are housed with disc surfaces facing one another with a pre-set interval in-between;

a transport mechanism for gripping one of the discs from the direction of disc thickness for transporting the disc thus held, wherein said transporting mechanism includes a holding portion inserted into neighboring ones of plural discs housed in said housing section, said holding portion being moved between an inserting position in which the holding portion is inserted into neighboring discs housed within the housing section and a receded position further outside of a disc rim than the transport complete position for the disc taken out from the housing section; and an actuating mechanism for enlarging the spacing between the one disc in the housing section held by said transport mechanism and at least both discs disposed on both sides of the one disc so as to be larger than said pre-set interval during the time the disc is held by said transport mechanism from the direction of disc thickness and during the time the disc is returned into said housing section.

9. The disc changer device as claimed in claim 8 wherein said holding portion includes a first inserting portion inserted into a space between one of plural discs housed within said housing section and a neighboring disc on one side of the one disc and a second inserting portion inserted into a space between the outer side of said one disc and another neighboring disc on the other side of the one disc and adapted for being moved in a direction of holding said one disc.

10. The disc changer as claimed in claim 9 wherein the first and second inserting portions are tapered in cross-section from the proximal end towards the distal end.

11. The disc changer as claimed in claim 1 further comprising a driving mechanism for driving said transport mechanism and the actuating mechanism.

12. The disc changer as claimed in claim 11 wherein the driving mechanism includes cam means having plural cams for driving said transport mechanism and the actuating mechanism.

* * * * *